United States Patent [19]
Bleecker

[11] 3,850,614
[45] Nov. 26, 1974

[54] PRODUCTION OF TUNGSTEN AND CARBIDE POWDER

[75] Inventor: William H. Bleecker, Pleasant Ridge, Mich.

[73] Assignee: Carmet Company, Pittsburgh, Pa.

[22] Filed: July 31, 1972

[21] Appl. No.: 276,819

Related U.S. Application Data

[62] Division of Ser. No. 35,879, May 8, 1970, abandoned.

[52] U.S. Cl. ............................................... 75/.5 BB
[51] Int. Cl. ............................................. C22b 57/00
[58] Field of Search ............................. 75/.5 BB, 84

[56] References Cited
UNITED STATES PATENTS

| | | | |
|---|---|---|---|
| 1,096,464 | 5/1914 | Schwarzkopf | 75/84 |
| 3,013,875 | 12/1961 | Triffleman | 75/.5 AC |
| 3,153,585 | 10/1964 | Laferty | 75/84 |
| 3,202,505 | 8/1965 | van den Berg et al. | 75/84 |

Primary Examiner—W. Stallard
Attorney, Agent, or Firm—Vincent G. Gioia; Robert F. Dropkin

[57] ABSTRACT

Described herein is the production of tungsten and tungsten carbide in powder form by chemically reducing to tungsten oxide a tungsten compound containing less than 100 ppm total of the elements, sodium, potassium, and calcium, and thereafter chemically reducing the tungsten oxide to tungsten powder with dry hydrogen having a dew point not higher than −30°F. The reduction is accomplished by passing the oxide through a reduction zone while flowing dry hydrogen through the zone in a direction concurrent with the oxide. The tungsten powder may be carburized to produce tungsten carbide powder.

3 Claims, No Drawings

PRODUCTION OF TUNGSTEN AND CARBIDE POWDER

This is a division of application Ser. No. 35,879, filed May 8, 1970, and now abandoned.

This invention relates to the production of tungsten and tungsten carbide in powder form. More particularly, it relates to the production of extremely fine powder useful in manufacturing cutting tools, dies, etc. in which particulate material is pressed and sintered.

So-called "sub-micron" tungsten carbide powder has been in considerable demand for use in manufacturing sintered components such as cutting tools, dies, etc.

In the conventional production of tungsten powder prior to carburizing to produce carbides of sub-micron size, effort is made to produce the finest metal powder possible because it is very difficult, if not impossible, to effectively further reduce the particle size of the metal or carbide powder produced. All milling or other means of comminution common to manufacturing cemented carbides cannot effectively reduce the particle size of the tungsten carbide component below about one micron. The tungsten agglomerates tend to form larger crystals of tungsten carbide during carburizing. Also, small crystals tend to be dissolved completely in the binder, e.g. cobalt, during sintering and tend to precipitate onto larger undissolved particles during cooling after sintering. The net effect of these two factors causes the resulting carbide microstructure to be coarser than would be anticipated from consideration of the tungsten particle size.

Ball milling or other means of comminution has not been effective in reducing the size of the tungsten carbide crystals produced in carburizing. Thus, to achieve substantially sub-micron particle sizes in cemented carbide products, it has been necessary to start with extremely small tungsten metal particle size. Production of satisfactorily small tungsten particles has been expensive and handling difficulties arise from the pyrophoric nature of such tungsten powders.

By the present invention it is possible to produce a substantially coarser tungsten powder which when subsequently carburized, yields a tungsten carbide which is notably more friable. Tungsten carbide produced by this method can be readily reduced in size by techniques known to the art from an average particle size of about 1.1 to 1.3 microns to an average size of about 0.5 micron, for example. This characteristic is primarily achieved by using a starting material comprising a high-purity tungsten compound containing less than 100 ppm total of the elements sodium, potassium, and calcium to produce an oxide which is then chemically reduced in a dry hydrogen atmosphere with the hydrogen stream flowing in the same direction in which oxide is passed through the reduction zone.

In the presently preferred embodiment of the invention ammonium paratungstate containing less than 100 ppm total of the elements sodium, potassium, and calcium is reduced to a blue tungstic oxide in a rotary kiln. The tungstic oxide is reduced to tungsten metal powder in a conventional tube reduction furnace, except that the flow of hydrogen is concurrent to the movement of material through the tube and the maximum dew point of the hydrogen is −30°F. Under these conditions the tungsten metal powder produced will have an average particle size of about 1.1 to 1.3 microns as determined by the Fisher Sub Sieve Sizer.

Photelometric determination of the particle size distribution of powder produced in accordance with the invention indicates that usually 20–30 weight percent of this tungsten has a particle size of less than 1 micron, and 20–30 weight percent is in the 1.5–2.5 micron range. When this tungsten powder is carburized by conventional techniques, the average particle size increases by about 0.1–0.2 micron. However, a unique characteristic of the tungsten carbide produced as described above is that it can be readily reduced by typical comminuting techniques, such as ball milling, to an average particle size of about 0.5 micron. Conventional tungsten carbide of equivalent average particle size is reduced in size only slightly under the same conditions.

Moreover, when ball milled with the addition of 10 percent by weight of cobalt, a cemented carbide body can be produced having a microstructure with only very few tungsten carbide particles as large as 1 micron. Conventional tungsten carbide treated in this same manner exhibits a microstructure consistent with the average particle size of the tungsten carbide as measured before ball milling. Physical properties of cemented carbides made from tungsten carbide produced in accordance with the invention are significantly improved because of the unique property of friability of the powder from which the sintered carbide articles are manufactured.

The following example will illustrate a specific practice of the invention in accordance with the presently preferred embodiment.

EXAMPLE

Eight hundred fifteen pounds of ammonium paratungstate powder containing less than 100 parts per million of the elements sodium, potassium, and calcium was calcined in the usual manner in an atmosphere of dissociated ammonia at 1000–1150°F. The resulting blue tungsten oxide had an oxygen deficiency of 0.53 percent, and an average particle diameter as measured by the Fisher Sub Sieve Sizer of 11 to 14 microns. The yield was 699.4 pounds of this blue oxide.

The tungsten oxide was loaded into molybdenum reduction boats and fed to a gas-fired reduction furnace. Atmosphere flow was maintained at 78 liters per minute of dry hydrogen, having a nominal dew point of −60°F. The reduction temperature rose from 1300°F to 1650°F as the reduction boats advanced in the furnace. The flow of hydrogen was concurrent with the movement of the boats through the furnace. After reduction, the powder was screened through 200 mesh to remove coarse agglomerates and scale. This powder had an average particle size of 1.05 microns, and the yield was 558 pounds of pure tungsten powder.

The metal powder was blended in the usual manner with 36.5 pounds of pure carbon black and carburized at 2750°F for one-half hour in a graphite crucible as is well known to those familiar with this art. Typical analysis of the powder after carburizing was 6.11 percent total carbon, with a trace of free carbon being present. The particle size had increased to 1.25 microns.

The tungsten carbide powder obtained as above was blended and milled with 10 percent by weight of fine cobalt powder and 0.3 percent vanadium carbide for 70 hours in a ball mill with a hydrocarbon solvent. The milling media used in this operation were also made of a 10 percent cobalt-tungsten carbide alloy. A lubricant, e.g. paraffin was added to the powder blend to facilitate pressing.

The dried and lubricated powder was pressed into standard specimens of size 0.930 × 0.310 × 0.250 inch, presintered at 1200°F, and final sintered in vacuum for one-half hour at 2600°F. The resulting parts were ground, polished, and etched in the usual manner to reveal the microstructure of the alloy. The grain size, determined according to ASTM Procedure B390-64, "Evaluating Apparatus Grain Size and Distribution of Cemented Tungsten Carbide", was essentially 0.25 to 0.50 micron, with a maximum individual particle size of about 1.0 micron.

Tungsten metal powder made in accordance with the invention differs considerably from the conventional fine powder in 1.1 to 1.3 micron range. Firstly, the submicron fraction is unexpectedly higher and, secondly, the larger particles are loosely bound agglomerates, with a lesser tendency to retain their size identity in the ball milling operation after carburizing. Any tendency toward particle growth in sintering via the previously mentioned mechanism can be further precluded by "inhibitors" such as tantalum carbide, titanium carbide, chromium carbide, and vanadium carbide in amounts of from 0.1 to 0.5 percent. The latter is preferred and is used in preferred embodiments in amounts of 0.2 to 0.3 percent.

Tungsten powder produced by the method described herein is not pyrophoric and cemented carbides made therefrom contain only few particles as large as one micron.

It is apparent from the above that various changes and modifications may be made without departing from the invention.

Accordingly, the scope of the invention should be limited only by the appended claims wherein what is claimed is:

1. A method of making tungsten powder which comprises chemically reducing to tungsten oxide a tungsten compound containing less than 100 ppm total of the elements sodium, potassium, and calcium and chemically reducing said tungsten oxide to tungsten powder with dry hydrogen having a dew point not higher than −30°F by passing said oxide through a reduction zone while flowing said dry hydrogen therethrough in a direction concurrent with the oxide.

2. A method according to claim 1 wherein said tungsten compound contains less than 50 ppm total of the elements sodium, potassium and calcium.

3. A method according to claim 1 wherein said tungsten compound is ammonium paratungstate.

* * * * *